(12) United States Patent
Hwang et al.

(10) Patent No.: US 10,271,562 B2
(45) Date of Patent: Apr. 30, 2019

(54) YOGURT FERMENTER FOR HOME USE

(71) Applicant: Yoontaek Hwang, Seoul (KR)

(72) Inventors: Yoontaek Hwang, Seoul (KR);
Jungeun Yim, Seoul (KR); Soojin Hwang, Seoul (KR); Jimin Hwang, Seoul (KR)

(*) Notice: Subject to any disclaimer, the term of this patent is extended or adjusted under 35 U.S.C. 154(b) by 1056 days.

(21) Appl. No.: 14/409,553

(22) PCT Filed: Jun. 20, 2013

(86) PCT No.: PCT/KR2013/005427
§ 371 (c)(1),
(2) Date: Dec. 19, 2014

(87) PCT Pub. No.: WO2013/191477
PCT Pub. Date: Dec. 27, 2013

(65) Prior Publication Data
US 2015/0189894 A1  Jul. 9, 2015

(30) Foreign Application Priority Data

Jun. 21, 2012 (KR) .................. 10-2012-0066443

(51) Int. Cl.
*A23C 9/12* (2006.01)
*A23C 9/123* (2006.01)

(52) U.S. Cl.
CPC ............ *A23C 9/123* (2013.01); *A23C 9/1226* (2013.01)

(58) Field of Classification Search
CPC .............................. A23C 9/1226; A23C 9/123
USPC ........... 426/237, 241, 520, 521, 522; 99/453
See application file for complete search history.

(56) References Cited

U.S. PATENT DOCUMENTS

| | | | | |
|---|---|---|---|---|
| 2,607,566 A * | 8/1952 | Saunders | ............... | A23C 3/031 165/109.1 |
| 4,738,858 A * | 4/1988 | Mukouyama | ......... | A47J 27/004 426/241 |
| 5,680,769 A | 10/1997 | Katz | | |
| 2014/0273200 A1 * | 9/2014 | Rozek | .................... | C12M 41/14 435/303.1 |

FOREIGN PATENT DOCUMENTS

| | | | |
|---|---|---|---|
| FR | 831779 | * | 9/1938 |
| KR | 91008048 | | 10/1991 |
| KR | 200419077 | | 6/2006 |
| KR | 1020070102187 | | 10/2007 |
| KR | 100796631 | | 1/2008 |

OTHER PUBLICATIONS

English Language Translation of KR1019910008048.*

* cited by examiner

*Primary Examiner* — Dana Ross
*Assistant Examiner* — Joseph W Iskra
(74) *Attorney, Agent, or Firm* — Harness, Dickey & Pierce, P.L.C.

(57) ABSTRACT

Provided is a yogurt fermenter, comprising: a head unit; a heating unit which is formed to protrude, is formed integrally at a lower surface of the head unit, and builds in a heating element; and a fermenter engaging unit which is formed at a lower side of the head unit to engage the head unit to a fermentation container, wherein when the fermenter engaging unit is engaged to an upper side of the fermentation container containing a fermentation substance, the heating unit is submerged in the fermentation substance to directly provide heat thereby performing fermentation.

4 Claims, 8 Drawing Sheets

YOGURT FERMENTER FOR HOME USE

CROSS-REFERENCE TO RELATED APPLICATIONS

This is a US national phase of PCT patent Application No. PCT/KR2013/005427 having an international filing date of Jun. 20, 2013, which claims priority to Korean Patent Application No. 10-2012-0066443, filed on Jun. 21, 2012, the entireties of which are incorporated herein by reference.

TECHNICAL FIELD

The present invention relates to a yogurt fermenter for home use, and in particular to a yogurt fermenter which is characterized in that a yogurt fermenter may be directly engaged to a milk container after removing a cap of the milk container which is generally available at a market in a state where a heating unit is submerged and heated in a milk for thereby fermenting the milk, so the milk container may be directly used as a fermentation container, by which it does not need to inconveniently divide and partially pour out the milk, and after the fermentation is completed, the milk container may be directly cold-stored in a refrigerator without transferring the yogurt, and a large space is not necessary for the storage or use of the yogurt fermenter, and since there is little chance for the heat to leak out for thereby efficiently using electric power, while providing an easier washing of the yogurt fermenter after the yogurt fermenter is used.

BACKGROUND ART

In order to ferment milk into yogurt, it needs to mix a yogurt seed culture and to maintain a proper fermentation temperature. If the proper fermentation temperature is maintained in a state where the yogurt seed culture is mixed, the milk becomes a drinkable yogurt state after about 4~5 hours and becomes an illiquidity yogurt after about 8~9 hours. If the above time limit is over passed, the yogurt becomes over fermented, so flavor may be degraded.

The conventional yogurt fermenter is configured in a structure wherein a lactic acid bacteria seed culture is mixed in milk and is divided and poured into about ten fermentation cups, and the ten fermentation cups are stored in a heating housing (for example, as disclosed in the Korean Utility Model Application Number 20-2002-0020810). In case of the above-mentioned yogurt fermenter, a huge space is necessary for the storage and use of the fermenter due to the dimension of the housing. Since the housing is heated, the loss of the heat energy may increase, and it needs to inconveniently divide and pour the milk into separate multiple fermentation cups. In addition, it also needs to inconveniently store, in the cold state, about ten fermentation cups each filled with the finished yogurt. Since the about ten fermentation cups occupy a lot of the space of the refrigerator, the use of the space of the refrigerator is inefficient. More inconveniently, it needs to wash and dry and store ten empty fermentation cups and the cap after all the yogurt are eaten.

DISCLOSURE OF INVENTION

Technical Problem

Accordingly, it is an object of the present invention to provide a yogurt fermenter which is characterized in that since a milk container may be directly used as a fermentation container, the fermentation of the yogurt and its cold storage are easy, and the space for the use and storage of the fermenter may be saved, and electric power may be efficiently used, and it is easy to wash the yogurt fermenter after the use thereof.

Solution to the Problem

To achieve the above object, there is provided a yogurt fermenter including a head unit; a control unit arranged at the head unit for setting and controlling time and temperature; a fermenter engaging unit which is fixed at one surface of the head unit and is formed in a shape of a bottle cap having screw threads at its inner circumferential surface; and a tube type sealing case which is integrally fixed inside of the fermenter engaging unit and is longitudinally formed in a vertical direction, with its end portion being blocked, wherein a heat insulation unit and a heating element which is heated by electric power are sealed inside of the tube type sealing case.

Advantageous Effects

The yogurt fermenter according to the present invention is configured in such a way that a control unit is arranged at a head unit whose dimension is similar with a cap of a finished milk container selling, and a tube-type sealing case in which a heating element and a temperature detection unit are sealed, and a bottle cap-shaped fermenter engaging unit are fixed on the same surface of the head unit. When the yogurt fermenter is not used and stored, a protection case made from a transparent plastic material configured to protect the tube-type sealing case is secured to the fermenter engaging unit, and when the yogurt fermenter is actually used, the head unit to which the fermenter engaging unit is secured is engaged to a milk container instead of the cap of the milk container, and the portion of the tube-type sealing case in which the heating element and the temperature detection unit are sealed, is submerged in the milk.

Therefore, the dimension of the yogurt fermenter including the protection case is similar with the typical milk container, and the diameter of the yogurt fermenter is also similar with the diameter of the cap of the typical milk container, so that the yogurt fermenter of the present invention takes smaller space as compared with other yogurt fermenters. When the yogurt fermenter is not used, it is easy to store, not taking a large amount of space. When the yogurt fermenter is actually used, the milk container available at the market may be directly used as the yogurt fermenter container, so arranging wide space for the yogurt fermenter is not necessary, which results in an efficient use of the space when producing the yogurt. Since the center of the milk in the milk container is heated, all the heat may be efficiently transferred to the milk, so the use of the heat energy is very efficient. In addition, the produced yogurt may be directly stored in the refrigerator after the original cap of the milk container is closed. Since the yogurt fermenter may be stored after only the portion of the tube-type sealing case is cleaned, so the following procedures are very easy. In addition, the milk container after the yogurt is eaten up may be just discarded, so it does not need to wash the container so as to produce new yogurt.

BEST MODES FOR CARRYING OUT THE INVENTION

The exemplary embodiments of the present invention will be described with reference to the accompanying drawings. Such description is not intended to limit the specific embodiments of the present invention, but it should be understood to include all modification, equivalents and alternatives in the scope of the concept and technology of the present invention.

Figure 1:
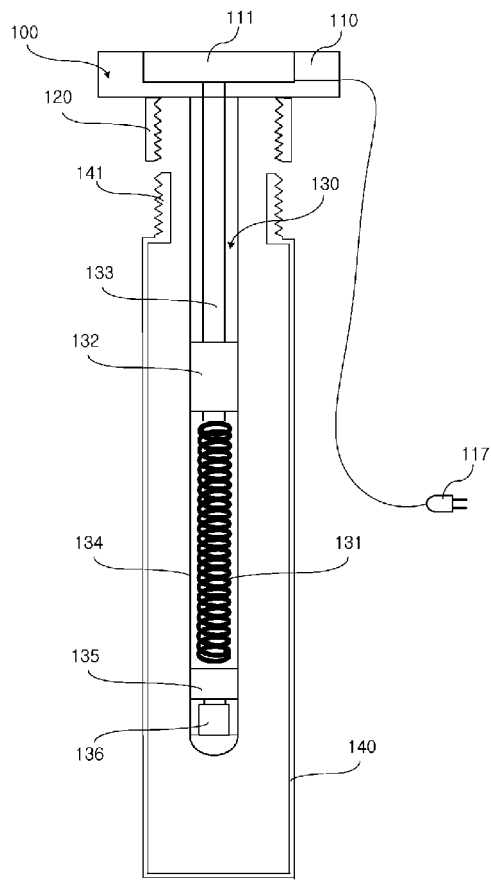
FIG. 1 is a front side horizontal cross sectional view illustrating a yogurt fermenter according to a first exemplary embodiment of the present invention.
Figure 2:
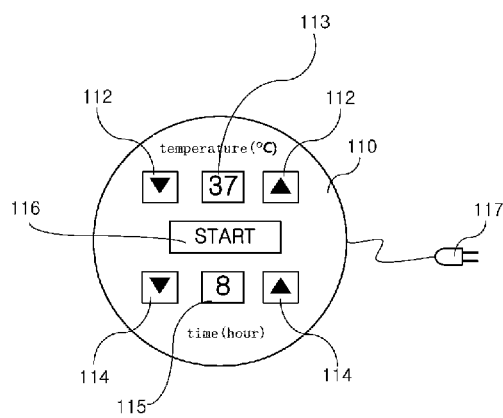
FIG. 2 is a top side plane view illustrating a control unit of a yogurt fermenter according to a first exemplary embodiment of the present invention.
Figure 3:
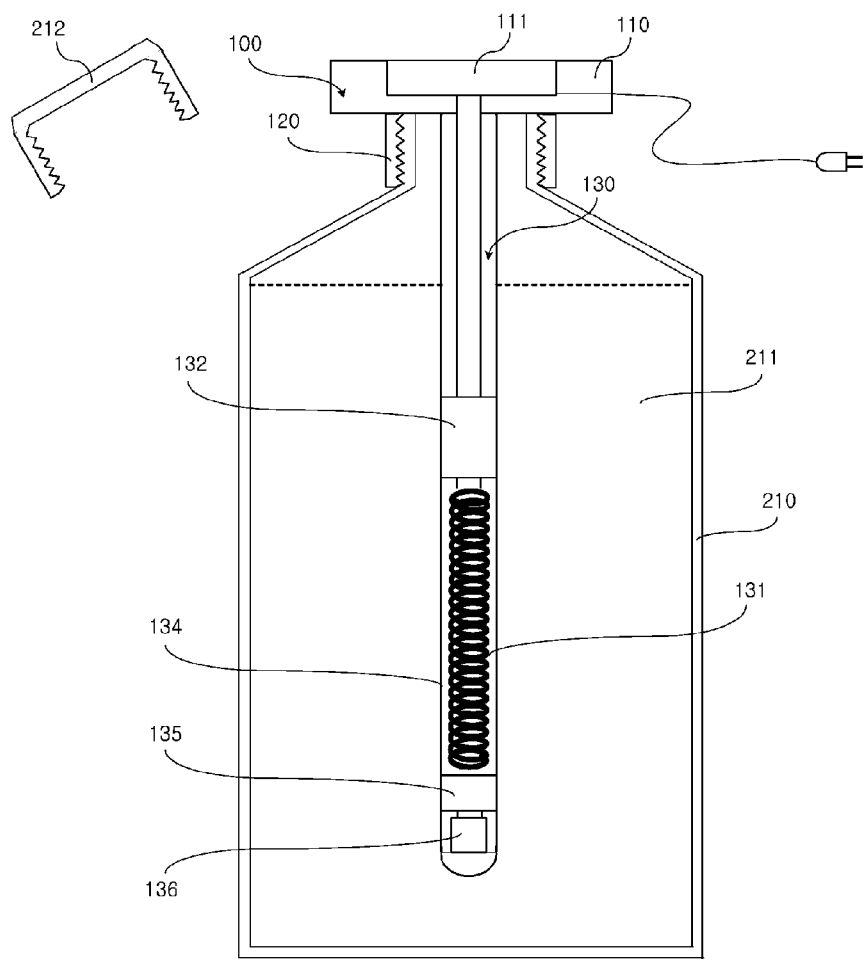
FIG. 3 is a front side horizontal cross sectional view illustrating an example of use where yogurt is fermented using a yogurt fermenter according to a first exemplary embodiment of the present invention.
Figure 4:
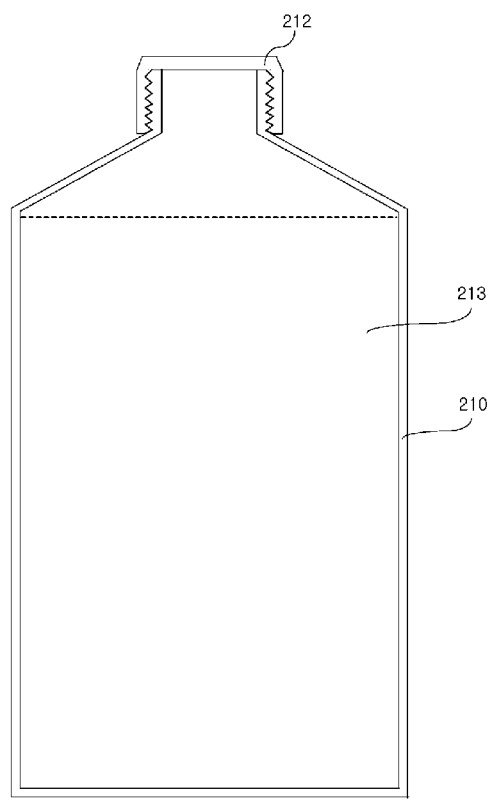
FIG. 4 is a front side horizontal cross sectional view illustrating an example of use where yogurt fermented by a yogurt fermenter according to a first exemplary embodiment of the present invention is cold-stored.

FIG. 1 is a front side horizontal cross sectional view illustrating a yogurt fermenter according to a first exemplary embodiment of the present invention. FIG. 2 is a top side plane view illustrating a control unit of a head unit according to the exemplary embodiment of the present invention. FIG. 3 is a front side horizontal cross sectional view illustrating an example of use where yogurt is fermented using a yogurt fermenter according to the exemplary embodiment of the present invention. FIG. 4 is a front side horizontal cross sectional view illustrating an example of use where yogurt fermented by a yogurt fermenter according to the exemplary embodiment of the present invention is cold-stored.

Referring to FIG. 1, the fermenter unit 100 according to the exemplary embodiment of the present invention includes a head unit 110, a fermenter engaging unit 120 and a heating unit 130.

The head unit 110 has a dimension which is similar with the dimension of the cap of the milk container of milk which is available at the market and as illustrated in FIG. 2 includes a temperature setting button 112 used to manipulate the heating temperature and a temperature display unit 113 which shows set temperature, a time setting button 114 used to set the duration of heating time and a time display unit 115 which shows the duration of the remaining time, and a control unit 111 which has an operation start button 116. When an up arrow indication of each of the temperature setting button 112 and the time setting button 114 is pressed, the set number ascends, and if the down arrow indication is pressed, the set number descends.

As illustrated in FIG. 3, when the operation start button 116 is pressed after the time and temperature are set in a state where the fermenter unit 100 is secured to the milk container 210 filled with the milk 211, the heating element 131 is supplied with electric power and starts to heat. When the time set by the time setting button 114 has elapsed, the heating of the heating element 131 is completed, and meanwhile the control unit 111 controls the electric power of the heating element 131 so as to maintain the temperature of the milk 211. In order to make drinkable yogurt, the temperature is set to a proper fermentation temperature, and the time is

| [Legend of Reference Numbers of Major Components in the drawings] | |
|---|---|
| 100: fermenter unit | 110: head unit |
| 111: control unit | 112: temperature setting button |
| 113: temperature display unit | 114: time setting button |
| 115: time display unit | 116: operation start button |
| 117: plug | |
| 120: fermenter engaging unit | 121: detachable engaging unit |
| 122: locking groove | 123: locking protrusion |
| 124: fixing ring | 125: engaging unit screw thread |
| 126: rotation unit | 127: locking protrusion |
| 128: engaging unit screw thread | 129: engaging shoulder |
| 130: heating unit | 131: heating element |
| 132: top insulation unit | 133: electric cable guide unit |
| 134: tube type sealing case | 135: bottom insulation unit |
| 136: temperature detection unit | |
| 140: protection case | 141: protection case engaging unit |
| 210: milk container | 211: milk |
| 212: milk container cap | 213: yogurt |
| 220: fermentation-dedicated container | 221: milk |
| 222: fermentation-dedicated container mouth | 223: fermentation-dedicated container cap |
| 224: fermentation-dedicated container cap engaging unit | 225: pass-through unit |
| 226: fermentation-dedicated container fermenter engaging unit | 227: yogurt |
| 230: atypical container     231: milk | | set to 4~5 hours, and in order to make complete yogurt, the temperature is set to a proper fermentation temperature, and the time is set to 8~9 hours.

In the head unit 110, the fermenter engaging unit 120 fixed to the opposite side of where the temperature setting button 112 and the time setting button 114 are arranged has the same dimension and shape as the cap of the milk container of 1.8 liters and the cap of the milk container of 1.0 liters which are generally purchased by home, so that as illustrated in FIG. 3, the milk container cap 212 is opened from the milk container 210, and the fermenter unit 100 with the fermenter engaging unit 120 is covered and secured instead of the milk container cap 212. After the yogurt is made, the fermenter unit 100 is removed, and as illustrated in FIG. 4, the original milk container cap 212 of the milk container 210 is secured again, and the milk container 210 may be cold-stored somewhere.

The heating unit 130 is attached longitudinally in the downward direction inside of the fermenter engaging unit 120 of the head unit 110. The heating element 131 and the temperature detection unit 136 are sealed in the tube type sealing case 134 so as to avoid a direct contact with the milk 211. The tube type sealing case 134 is made from a predetermined material such as glass or stainless steel which is resistant to heat and is rust free and chemically stable. As illustrated in FIG. 3, when the heating element 131 is heated in a state where the fermenter unit 100 is secured to the milk container 210, the top insulation unit 132 blocks the stream of the heat since the top insulation unit 132 seals over the top side of the heating element 131 in order for the heat of the heating element 131 not to move in the upward direction of the heating element 131, and the bottom insulation unit 135 seals over the bottom of the heating element 131 for thereby preventing the stream of the heat, and the temperature detection unit 136 is positioned at the bottom thereof. The electric cables connecting the heating element 131 and the temperature detection unit 136 to the control unit 111 are connected to the control unit 111 with the aid of the electric cable guide unit 133 which is resistant to heat. A temperature sensor is installed at the temperature detection unit 136 in order for the control unit 111 to control the temperature, and a temperature operation switch such as a bimetal, etc. may be embedded in the temperature detection unit 136 to directly control the temperature.

The top and bottom positions of the heating element 131 are determined in consideration of the convection and conduction of the heat. The center of the heating element 131 may be positioned at one third portion from the bottom to the top of the milk in preparation for the lack of milk, and when viewing the position on the plane surface, the center thereof is positioned at the center of the milk container 210.

According to the exemplary embodiment of the present invention, since the heating is performed at the center of the milk 211, the heat may be directly transferred to around the heating unit 130, and the heating may start from the bottom of the milk container 210, for which the heat may be transferred to the whole portions of the milk 211 with the aid of the convection of the milk 211. The temperature detection unit 136 is positioned at the bottom of the tube type sealing case 134 and is sealed by the bottom insulation unit 135, so the heat from the heating element 131 may be blocked, thus accurately measuring the temperature of the milk 211. If the temperature of the milk 211 is higher than the set temperature, the control unit 111 shuts off the electric power of the heating element 131 so as to prevent the temperature of the milk 211 from rising higher, and if the temperature of the milk 211 is lower than the set temperature, the control unit 111 connects the electric power of the heating element 131 so as to heat the milk 211 for thereby maintaining the temperature of the milk 211 at the set temperature.

When the set time has elapsed, the control unit 111 shuts off the electric power of the heating element 131 and controls in order for an alarm signal generate on the time display unit or in the form of an alarm sound. At this time, if the heating element 130 is directly pulled out, the user may get burn sine the heating element 130 is hot. To prevent this problem, it needs to generate the alarm signal after a predetermined cooling time elapsed after the electric power of the heating element 131 had been finally shut off.

As illustrated in FIG. 4, the fermentation-completed yogurt may be cold-stored somewhere after the original milk container cap 212 of the milk container 210 is secured.

Figure 5:
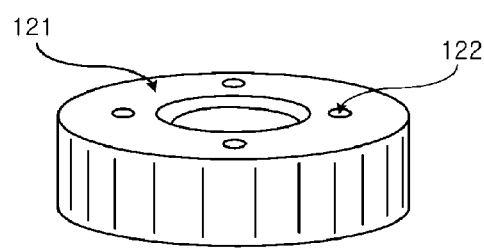
FIG. 5 is a perspective view illustrating a detachable engaging unit of a yogurt fermenter according to a second exemplary embodiment of the present invention.
Figure 6:
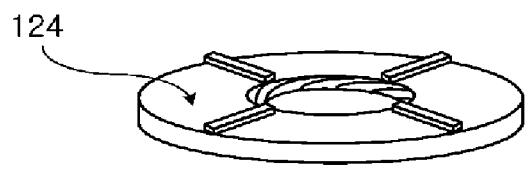
FIG. 6 is a perspective view illustrating a fixing ring which is configured to fix a detachable engaging unit of a yogurt fermenter according to a second exemplary embodiment of the present invention.
Figure 7:
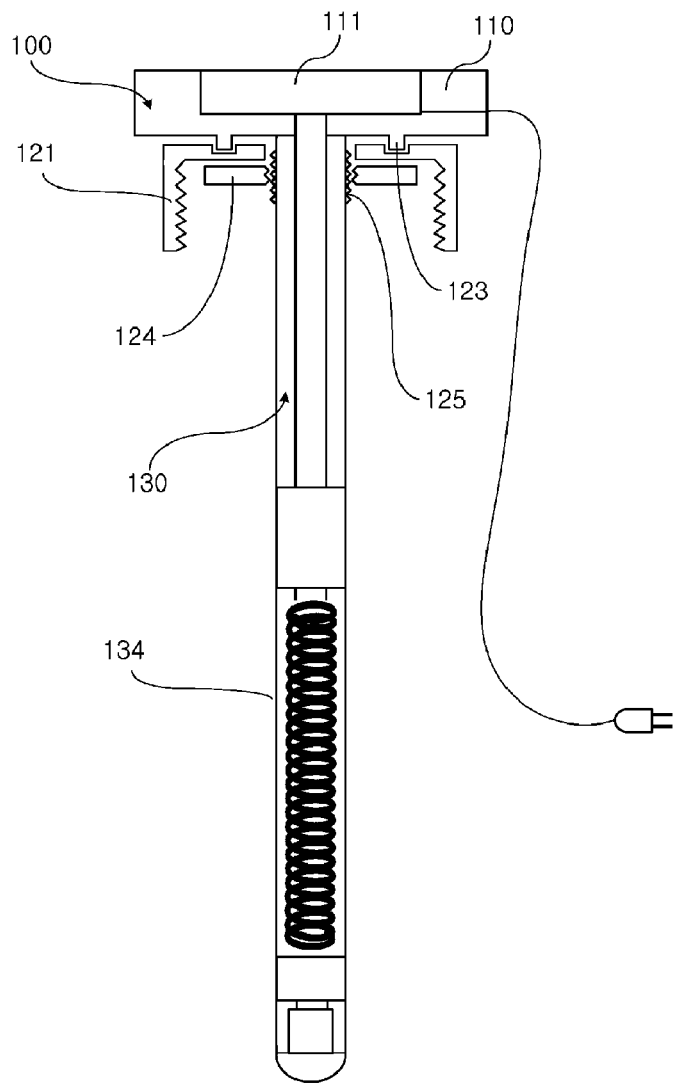
FIG. 7 is a front side horizontal cross sectional view illustrating a state where a detachable engaging unit is fixed at a yogurt fermenter according to a second exemplary embodiment of the present invention.

FIG. 5 is a perspective view illustrating a detachable engaging unit 121 according to a second exemplary embodiment of the present invention. FIG. 6 is a perspective view illustrating a fixing ring 124 according to the exemplary embodiment of the present invention. FIG. 7 is a front side horizontal cross sectional view illustrating a state where a detachable engaging unit 121 is fixed at a head unit 110 according to the exemplary embodiment of the present invention.

When the fermenter engaging unit 120 is integrated into the head unit 110, the shape of the milk container may change according to the brand or the country, so the milk container may not be used if the dimension and the shape of the mouth of the milk container also change. To resolve the above-mentioned problems, a hole and a locking groove 122 sized for the tube type sealing case 134 to pass through are formed at the center of the milk container cap 212 attached to a new milk container, and the fermenter engaging unit 120 is fixed to the head unit 110, so that it becomes possible to engage the fermenter unit 100 to the new milk container with different size. Therefore, for the sake of any type of the milk container, it is possible to form a detachable engaging unit 121 by forming a properly sized hole at the cap of the milk container, so the corresponding milk container may be used as a yogurt fermentation container.

The detachable engaging unit 121 may be formed by forming, at the center of the new milk container cap attached to the milk container with different size, a hole sized for the tube type sealing case 134 to pass through, and a locking groove 122 mating with the locking protrusion 123 of the head unit 110 or a hole. Engaging unit fixing device which comprises a fixing ring 124 as illustrated in FIG. 6 and engaging unit screw thread 125, is used to fix the detachable fermenter engaging unit 121 to the head unit 110. Threads are formed in the inner circumferential surfaces of the fixing ring 124 in the type of the disk or ring which has a hole sized for the tube type sealing case 134 to pass through, so the fixing ring 124 may be fixedly engaged with the engaging unit screw thread 125 formed at the outer circumferential surface on the side of the head unit 110 of the tube type sealing case 134. As illustrated in FIG. 7, the fixing ring 124 is engaged with the engaging unit screw thread 125 for thereby fixing the detachable engaging unit 121 to the head unit 110. At this time, as illustrated in FIG. 6, protrusions are formed on one surface of the fixing ring 124. The fixing ring 124 may be engaged with the engaging screw thread 125 with the surface having the protrusion facing downward, so the hands don't slip for thereby obtaining an easier fixing.

When the fixing ring 124 is fixed, since the locking protrusion 123 and the locking groove 122 are engaged with each other, so the detachable engaging unit 121 may be fixed at the head unit 110. The detachable engaging unit 121 may be engaged to the milk container 210 by rotating the head unit 110 in the closing direction; however when the head unit 110 is rotated in the opening direction, the fixing ring 124 may be disengaged as the detachable engaging unit 121 is not separated from the milk container 210. If the locking protrusion 123 is fixedly inserted in the locking groove 122, the fixing ring 124 is not disengaged even when the head unit 110 is rotated in the opening direction.

Figure 8:
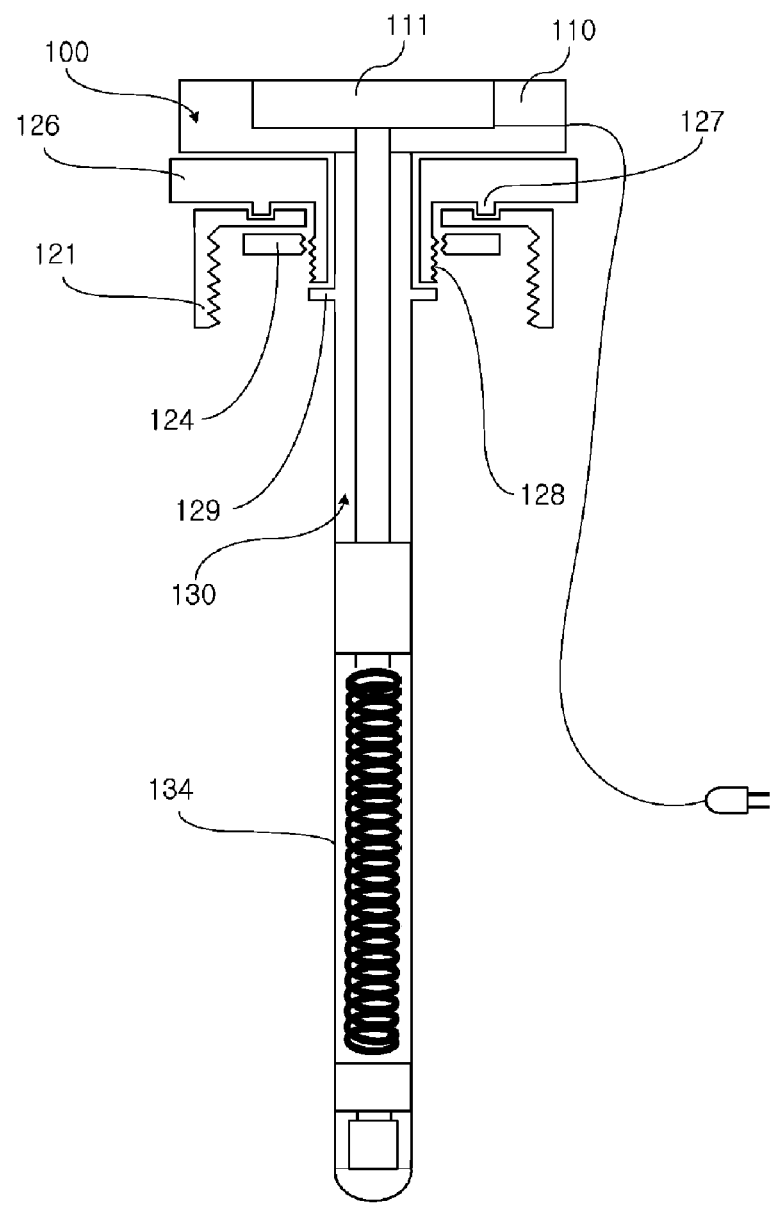
FIG. 8 is a front side horizontal cross sectional view illustrating a state where a detachable engaging unit is fixed at a rotation unit according to a third exemplary embodiment of the present invention.

FIG. 8 is a front side horizontal cross sectional view illustrating a shape where the detachable engaging unit 121 is fixed at the rotation unit 126 according to a third exemplary embodiment of the present invention. In this exemplary embodiment of the present invention, the detachable engaging unit 121 is rotatably fixed at the rotation unit 126. The rotation unit 126 has a hole sized for the tube type sealing case 134 to pass through and is configured like a circular disk with a large diameter and a thick thickness and a tube having at its outer circumferential surface an engaging unit screw thread 128 are concentrically integrated. The rotation unit 126 is installed to rotate about the heating unit 130 which works like a rotation axis and is installed for itself not to slip in the downward direction by means of the engaging shoulder 129 integrated at the heating unit 130 of the bottom of the rotation unit 126.

The top of the rotation unit 126 is formed in a shape of a thick circular plate larger than the diameter of the head unit 110, so it is possible to rotate the same by holding the top of the rotation unit 126 when the detachable engaging unit 121 is secured to the milk container 210. The fixing ring 124 is fixedly engaged with the engaging unit screw thread 128 with the detachable engaging unit 121 being disposed between them, so the detachable engaging unit 121 is fixed with rotation unit 126. At this time, the locking protrusion 127 is formed at the bottom of the top circular plate of the rotation unit 126 and is engaged with the locking groove 122 of the detachable engaging unit 121 for thereby preventing the fixing ring 124 from being disengaged even when the rotation unit 126 rotates in the opening direction.

Since the detachable engaging unit 121 is rotatably provided, the detachable engaging unit 121 may be secured to the milk container 210 even when the rotation unit 126 or the detachable engaging unit 121 rotates in a state where the head unit 110 with electric cables is not rotated.

Figure 9:
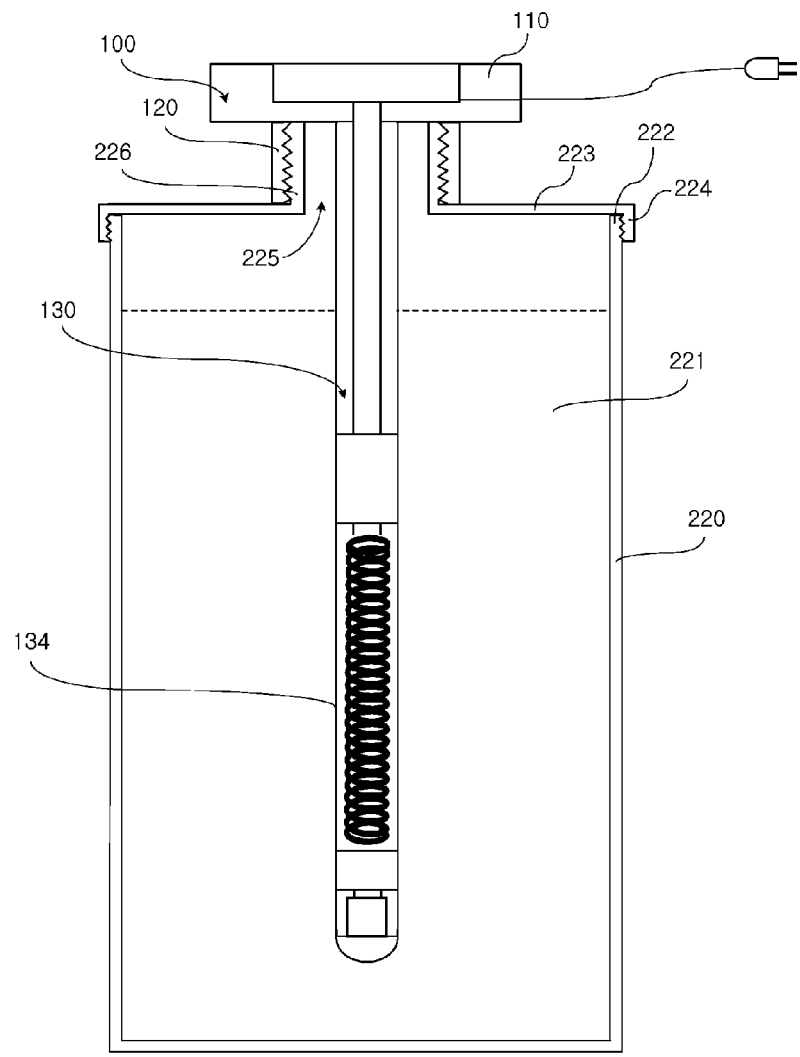
FIG. 9 is a front side horizontal cross sectional view for describing a fermentation-dedicated container according to a fourth exemplary embodiment of the present invention.
Figure 10:
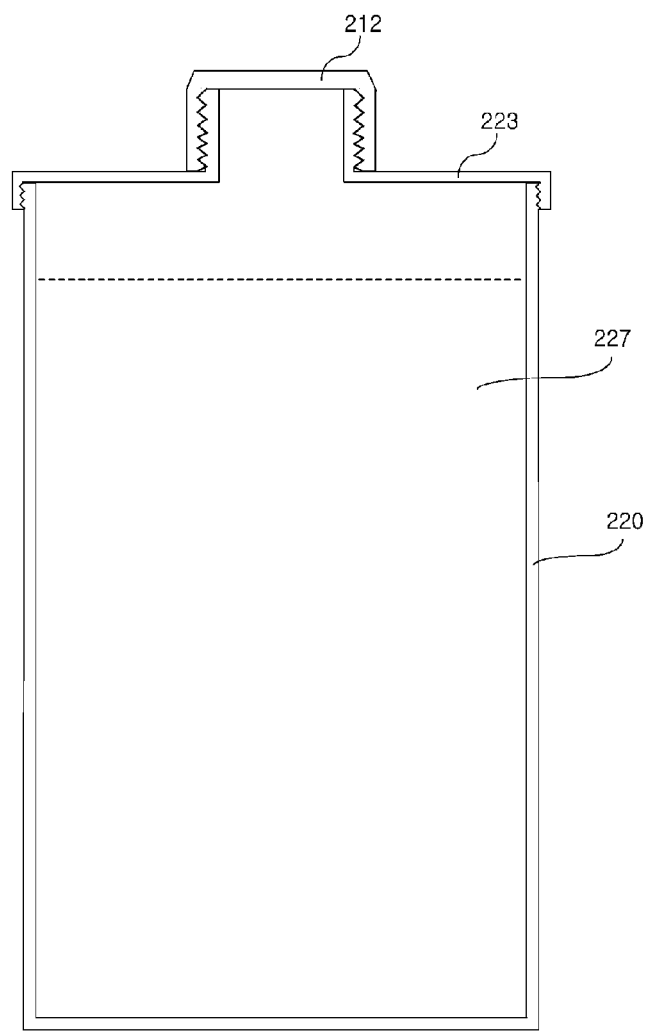
FIG. 10 is a front side horizontal cross sectional view illustrating an example of use wherein yogurt produced using a fermentation-dedicated container is cold-stored according to a fourth exemplary embodiment of the present invention.

FIG. 9 is a front side horizontal cross sectional view for describing the fermentation-dedicated container according to the fourth exemplary embodiment of the present invention, and FIG. 10 is a front side horizontal cross sectional view illustrating an example of use where the yogurt produced using the yogurt fermenter according to the exemplary embodiment of the present invention is cold-stored.

In the present exemplary embodiment of the present invention, the yogurt is fermented using the fermentation-dedicated container 220, not using the milk container 210. When the yogurt is made using the milk container 210, the yogurt is not the complete liquidity. Since the mouth of the milk container 210 is narrow, it needs to pull out the yogurt using a long spoon or after the milk container 210 is turned upside down. In order to prevent such a problem, the fermentation-dedicated container 220 with a wider mouth is used to easily pull out the finished yogurt, for which there are provided a pass-through unit 225 formed at the center of the fermentation-dedicated container cap 223 in order for the fermentation-dedicated container cap 223 covering the wider mouth, and the heating unit 130 to be inserted and engaged, and a fermentation-dedicated container fermenter engaging unit 226 which is formed around the pass-through unit 225. A screw thread is formed at an outer circumferential surface of the fermentation-dedicated container mouth 222 which corresponds to the upper of the fermentation-dedicated container 220, and a screw thread is also formed at the inner circumferential portion of the bottom of the fermentation-dedicated container cap 223, so the fermentation-dedicated container cap 223 may be engaged to the opening of the fermentation-dedicated container 220 with the aid of the two screw threads. The height of the fermentation-dedicated container 220 is similar with the height of the typical milk container, so when the heating unit 130 is inserted, and the fermenter engaging unit 120 is engaged to the fermentation-dedicated container fermenter engaging unit 226, the center of the heating element 131 may be positioned at one third portion from the bottom to the top of the milk 221.

When the yogurt is made using the fermentation-dedicated container 220, as illustrated in FIG. 10, the fermenter unit 100 is removed after the yogurt is made, and the original milk container cap 212 is secured to the pass-through unit 225 in which the heating unit 130 was inserted, and the yogurt may be cold-stored. In addition, when it needs to pull out the yogurt from the fermentation-dedicated container 220, the yogurt may be conveniently pulled out after opening the fermentation-dedicated container cap 223.

Figure 11:
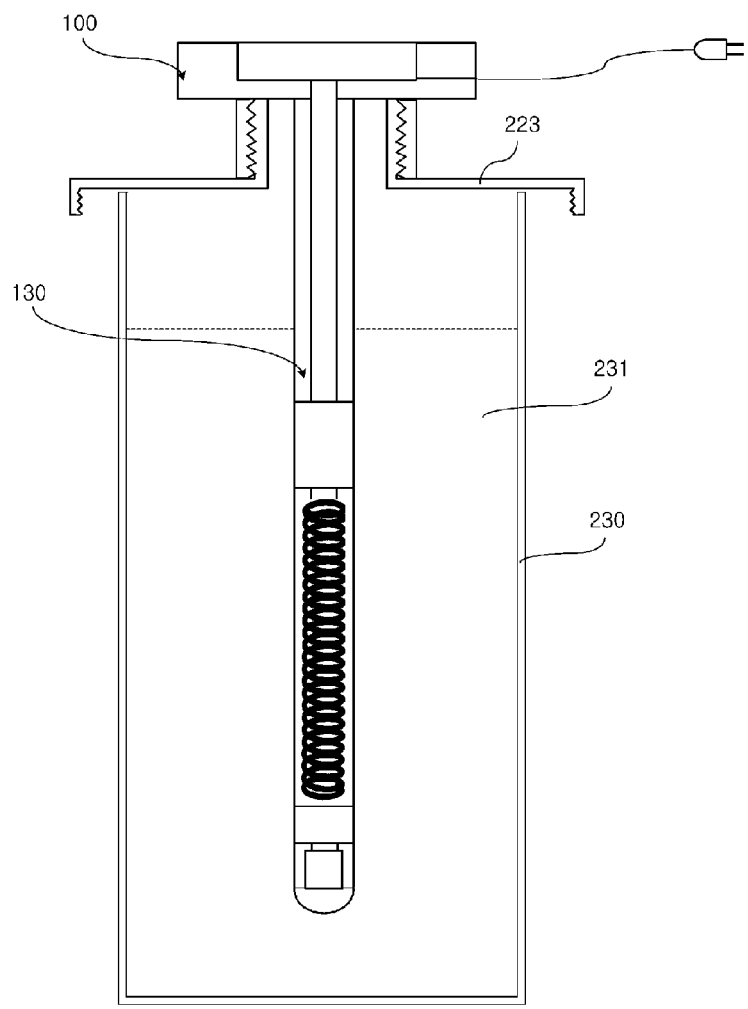
FIG. 11 is a front side horizontal cross sectional view illustrating an example of use where yogurt is produced using a yogurt fermenter according to a fifth exemplary embodiment of the present invention.

FIG. 11 is a front side horizontal cross sectional view for describing the fifth exemplary embodiment of the present invention. In case where the milk container is an atypical container 230 like a paper pack, etc. with a volume of about 1 liter, not a 1.8 liters bottle or a 1 little bottle, the mouth of the atypical container 230 like a paper pack, etc., and the yogurt fermenter of the present invention is secured to the mouth of the atypical container 230 and is heated in a state where the fermentation-dedicated container cap 223 is engaged to the fermenter unit 100 as illustrated in the drawing, for thereby fermenting yogurt.

In case where outside air temperature is low like in the winter, heat may lose through the surfaces of the milk container 210 or the fermentation-dedicated container 220. At this time, the case having a heat insulation function and made from a heat insulation material may cover the milk container 210 or the fermentation-dedicated container 220 or the fermentation-dedicated container 220 may be constituted to have a heat insulation function or may be made from a heat insulation material, so the yogurt may be stably fermented while preventing any loss of heat.

When the fermenter unit 100 is stored after the yogurt is fermented, the tube type sealing case 134 may be damaged when it collides with a hard thing, as illustrated in FIG. 1, the fermenter unit 100 may be inserted and stored in the protection case 140 made from a transparent plastic material. Since the protection case engaging unit 141 having a screw thread is formed at an outer circumferential surface of the opening of the protection case 140, it may be engaged to the fermenter engaging unit 120 or the detachable engaging unit 121. The portion of the tube type sealing case 134 of the fermenter may be fixed at the center of the protection case 140, while being separated from the side surface of the protection case 140. Here, the protection case 140 may be formed in a shape of an angular pillar so as to prevent the protection case 140 from rolling down.

We claim:

1. A yogurt fermenter, comprising:
    a head unit;
    a heating unit which is formed to protrude from the head unit and is formed integrally on a lower surface of the head unit, the heating unit including a heating element; and a fermenter engaging unit formed on the lower surface of the head unit to surround the heating unit, and includes a screw thread formed on an inner circumferential surface of the fermenter engaging unit, the fermenter engaging unit configured to engage the head unit to a mouth of a fermentation container containing a fermentation substance, wherein in response to the fermenter engaging unit being engaged to the mouth of the fermentation container, the fermenter engaging unit is configured to submerge the heating unit into the fermentation substance, and the heating unit is configured to directly provide heat thereby performing fermentation of the fermentation substance; and a rotation unit configured to, engaged the heating unit, and rotate around the heating unit, wherein the fermenter engaging unit is fixed to the rotation unit such that the head unit and the heating unit do not rotate together with the fermenter engaging unit even when the rotation unit and the fermenter engaging unit rotate to engage the fermentation container.

2. The fermenter of claim 1, further comprising:

an engaging unit fixing device configured to fix the fermenter engaging unit to the rotation unit, wherein the fermenter engaging unit is configured to be engaged as a detachable engaging unit.

3. The fermenter of claim 2, wherein the engaging unit fixing device comprises:

a fixing ring including a through-hole formed in a center of the engaging unit fixing device, wherein the through-hole of the fixing ring includes a screw, and the rotation unit includes a center which is formed to protrude in a lower direction, and the rotation unit includes an engaging unit screw thread formed on a protruding outer circumferential surface of the rotation unit, the rotation unit configured to screw the fixing ring into the engaging unit screw thread such that the detachable engaging unit is fixed between the rotation unit and the fixing ring.

4. The fermenter of claim 3, wherein the rotation unit includes a locking protrusion formed on a lower side of the rotation unit, and the detachable engaging unit includes a locking groove formed on an upper side of the detachable engaging unit, the detachable engaging unit configured to fit the locking protrusion into the locking groove such that the rotation unit and the detachable engaging unit integrally rotate.

* * * * *